(12) United States Patent
Liao

(10) Patent No.: US 8,500,140 B1
(45) Date of Patent: Aug. 6, 2013

(54) FRONT WHEEL FOLDING DEVICE FOR THREE-WHEEL CART INCLUDING GOLF BAG CART, BABY CART OR GOODS TRANSPORT CART

(75) Inventor: Gordon Liao, Tainan (TW)

(73) Assignee: Unique Product & Design Co., Ltd., Tainan (TW)

( * ) Notice: Subject to any disclaimer, the term of this patent is extended or adjusted under 35 U.S.C. 154(b) by 0 days.

(21) Appl. No.: 13/537,220

(22) Filed: Jun. 29, 2012

(51) Int. Cl.
*B62B 1/00* (2006.01)
(52) U.S. Cl.
USPC ................................ 280/38; 280/40; 280/654
(58) Field of Classification Search
USPC .............. 280/654, 651, 655, 645–646, 47.34, 280/47.27, 47.24, 43.1, 38
See application file for complete search history.

(56) References Cited

U.S. PATENT DOCUMENTS

| 7,770,912 B2 | 8/2010 | Liao |
| 2005/0046130 A1* | 3/2005 | Cheng et al. ............... 280/47.26 |

* cited by examiner

*Primary Examiner* — John Walters
*Assistant Examiner* — James Triggs
(74) *Attorney, Agent, or Firm* — Alan Kamrath; Kamrath IP Lawfirm, P.A.

(57) ABSTRACT

A front wheel folding device for a three-wheel cart including a golf bag cart, a baby cart or a goods transport cart includes: a fixed base with an upper end coupled to a cart frame and having an elastic press plate and a plurality of teeth; a moving base coupled to the fixed base by a rod and having a gear disk engaged with the teeth of the fixed base for performing a reciprocal rotating movement; and a front wheel set mounted to the moving base and having a front wheel. By pressing the press plate, the moving base is released to perform a rotating movement to drive the front wheel to be disposed at a horizontal state and folded. The aligning and folding processes can be completed all at the same time to achieve a convenient and quick operation.

5 Claims, 12 Drawing Sheets

US 8,500,140 B1

FRONT WHEEL FOLDING DEVICE FOR THREE-WHEEL CART INCLUDING GOLF BAG CART, BABY CART OR GOODS TRANSPORT CART

BACKGROUND OF THE INVENTION

1. Field of the Invention

The present invention relates to a front wheel folding device for a three-wheel cart including a golf bag cart, a baby cart or a goods transport cart and, more particularly, to the device capable of disposing the front wheel at a horizontal state and folding the cart all at the same time to provide a more convenient and quicker operation and a more simplified structure.

2. Description of the Related Art

In U.S. Pat. No. 7,770,912, a front wheel folding device for a three-wheel golf bag cart is disclosed. A front wheel is disposed at a horizontal state and then folded upward. The operation requires two steps and cannot be accomplished continuously all in one time. Thus, the patented invention is still not convenient enough, and the structure is still relatively complicated. Obviously, further improvements are required. In view of the aforementioned problem, the present invention provides a front wheel folding device to overcome the problem.

SUMMARY OF THE INVENTION

Therefore, it is a primary objective of the present invention to provide a front wheel folding device for a three-wheel cart including a golf bag cart, a baby cart or a goods transport cart capable of disposing the front wheel at a horizontal state and folding the cart all at the same time to achieve a more convenient and quick operation.

Another objective of the present invention is to provide a simpler structure of a front wheel folding device for a three-wheel cart including a golf bag cart, a baby cart or a goods transport cart.

To achieve the foregoing objectives, the present invention provides a front wheel folding device of a three-wheel cart, comprising: a fixed base with an upper end coupled to a cart frame and having an elastic press plate and a plurality of teeth; a moving base coupled to the fixed base by a rod and having a gear disk engaged with the plurality of teeth of the fixed base for performing a reciprocal rotating movement; and a front wheel set mounted to the moving base and having a front wheel. By pressing the press plate, the moving base is released to perform a rotating movement to drive the front wheel to be disposed at a horizontal state and folded. The disposing at a horizontal state and folding processes can be completed all at the same time to achieve a convenient and quick operation.

DETAILED DESCRIPTION OF THE PREFERRED EMBODIMENTS

Figure 1:
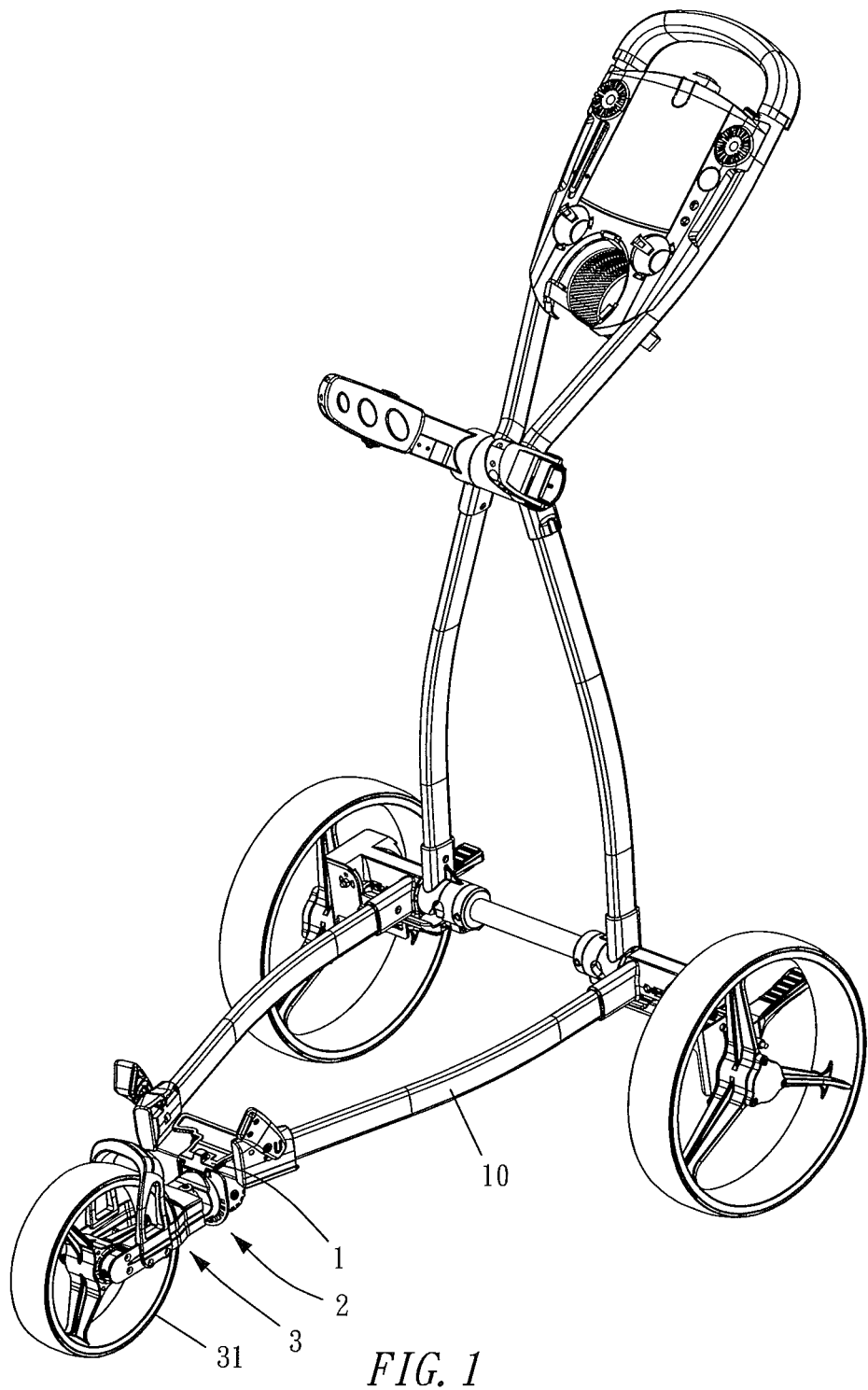
FIG. 1 is a perspective view of the present invention installed to a golf bag cart.
Figure 2:
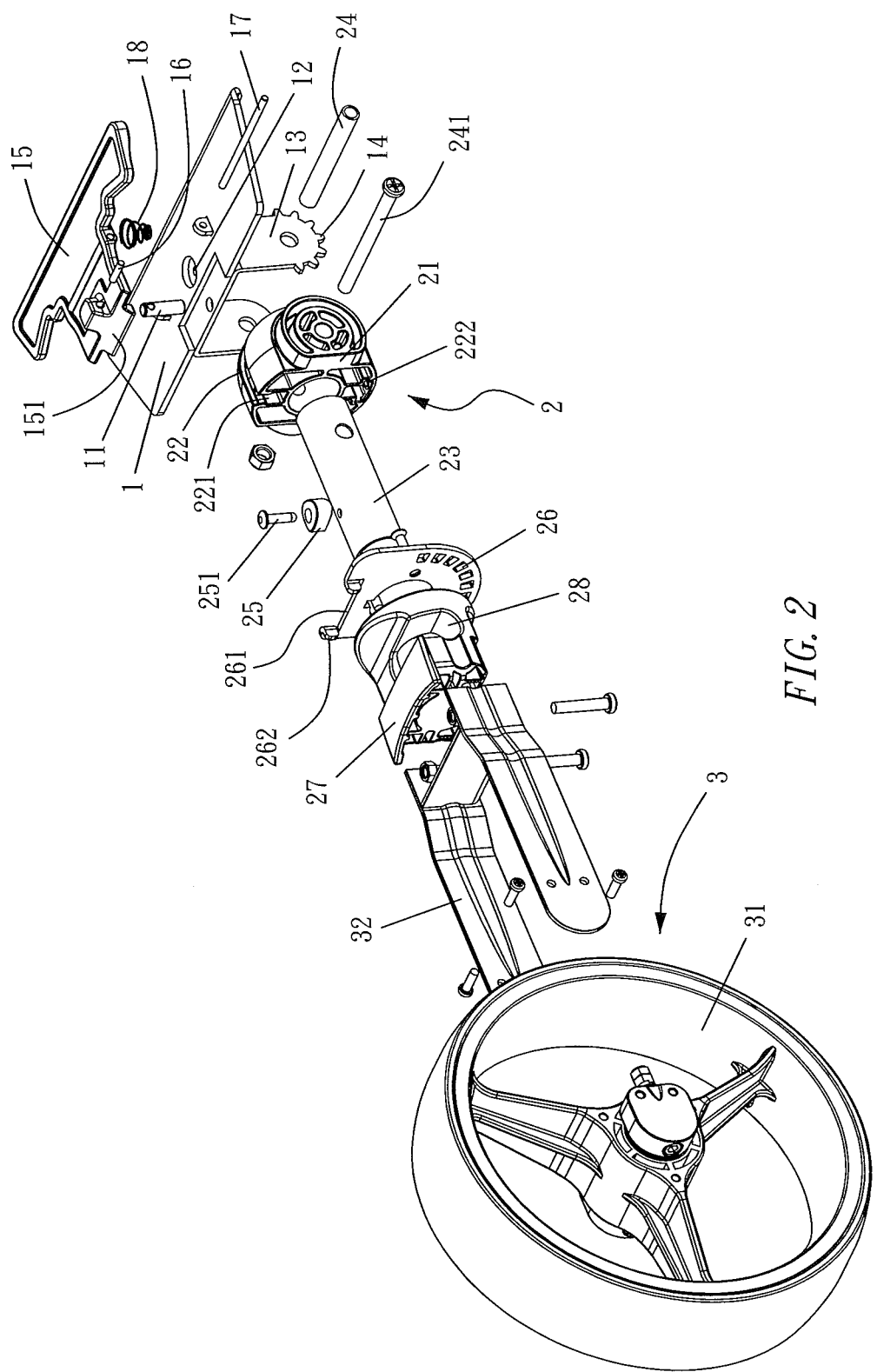
FIG. 2 is an exploded view of the present invention.

The technical characteristics and effects of the present invention will become apparent with the detailed description of preferred embodiments accompanied with the illustration of related drawings.

With reference to FIGS. 1 to 5, a fixed base 1 has an end (particularly an upper end) coupled to a cart frame 10 (particularly a lower cart frame), and has a direction pin 11 penetrating through both top and bottom sides of the fixed base 1. The direction pin 11 has a stop column 12 disposed at a rear side of the direction pin 11 and protruded downwardly. The fixed base 1 has two lugs 13 formed at the bottom (end) of the fixed base. The two lugs 13 have a semicircular gear 14 installed at the bottom of the lugs 13. The top of the fixed base 1 is pivotally coupled to a press plate 15 by a positioning pin 16. A positioning pin 17 is pivotally coupled to the press plate 15 and the direction pin 11. The two positioning pins 16, 17 serve as rotating shafts. The press plate 15 has an elastic element 18 (such as a spring) installed between a middle rear section of the press plate 15 and the fixed base 1 to form an elastic press plate. The press plate 15 has a bump 151 at a front end. A moving base 2 includes a rotating fixed block 21, a fixed shaft 23, a gear disk 26 and a connecting block 27. The rotating fixed block 21 is substantially in a spherical shape, has a channel 22 formed at the middle of an outer side of the rotating fixed block 21, and is engaged with the fixed base direction pin 11. The channel 22 has a latch hole 221 formed at a front end of the channel 22 and an elastic slot 222 formed at a rear end of the channel 22. An end of the fixed shaft 23 is coupled to the rotating fixed block 21. A rod 24 and a set of screws 241 are passed and installed to fix the fixed base lug 13, the rotating fixed block 21 and the fixed shaft 23. The gear disk 26 is coupled to the fixed shaft 23 and engaged with the semicircular gear 14 of the fixed base 1, whose upper end has a notch 261 for precisely containing the bump 151 of the press plate. Each of both sides of the notch 261 has a stop plate 262. The connecting block 27 is coupled to the other end of the fixed shaft 23 and fixed to the gear disk 26, and has a groove 28 formed thereon, for containing a stop block 25 of the fixed shaft 23. The stop block 25 is fixed onto the fixed shaft 23 by a rivet 251 for limiting the connecting block 27 from moving.

A front wheel set 3 has a front wheel 31 and a front wheel frame 32. The front wheel frame 32 is fixed to the connecting block 27 to connect the moving base 2 and the front wheel set 3 together.

With the aforementioned assembly as shown in FIGS. 1, 3, 4 and 5, the direction pin 11 is inserted into the latch hole 221 at the channel disposed at the front end of the rotating fixed block channel. The elastic element 18 is situated at a stretching status for propping and tilting the press plate 15 towards the rear, as well as pressing the fixed base 1. In the meantime, the bump 151 at the front end of the press plate is disposed in the notch 261 of the gear disk 26 and blocked by two stop plates 262 to assure the stability of fixing the fixed base 1 with the moving base 2. The semicircular gear 14 of the lug is engaged with the gear disk 26 in order to latch the rotating fixed block 21 of the moving base 2 to the gear disk 26 to further enhance the stability of fixing the fixed base 1 with the moving base 2 and maintain the front wheel 31 in an unfolded and erected status.

Figure 11:
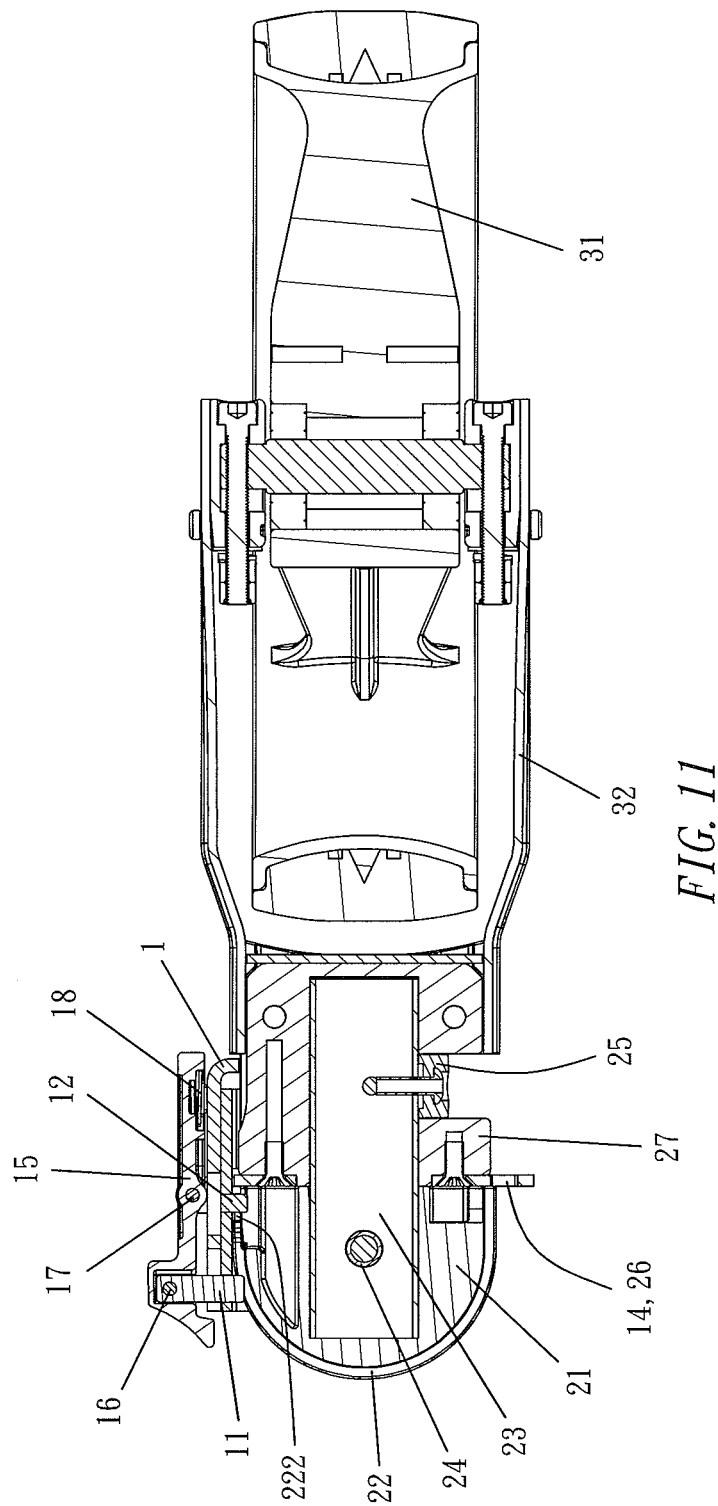
FIG. 11 is a cross-sectional view of a front wheel of the present invention disposed at a horizontal state.
Figure 12:
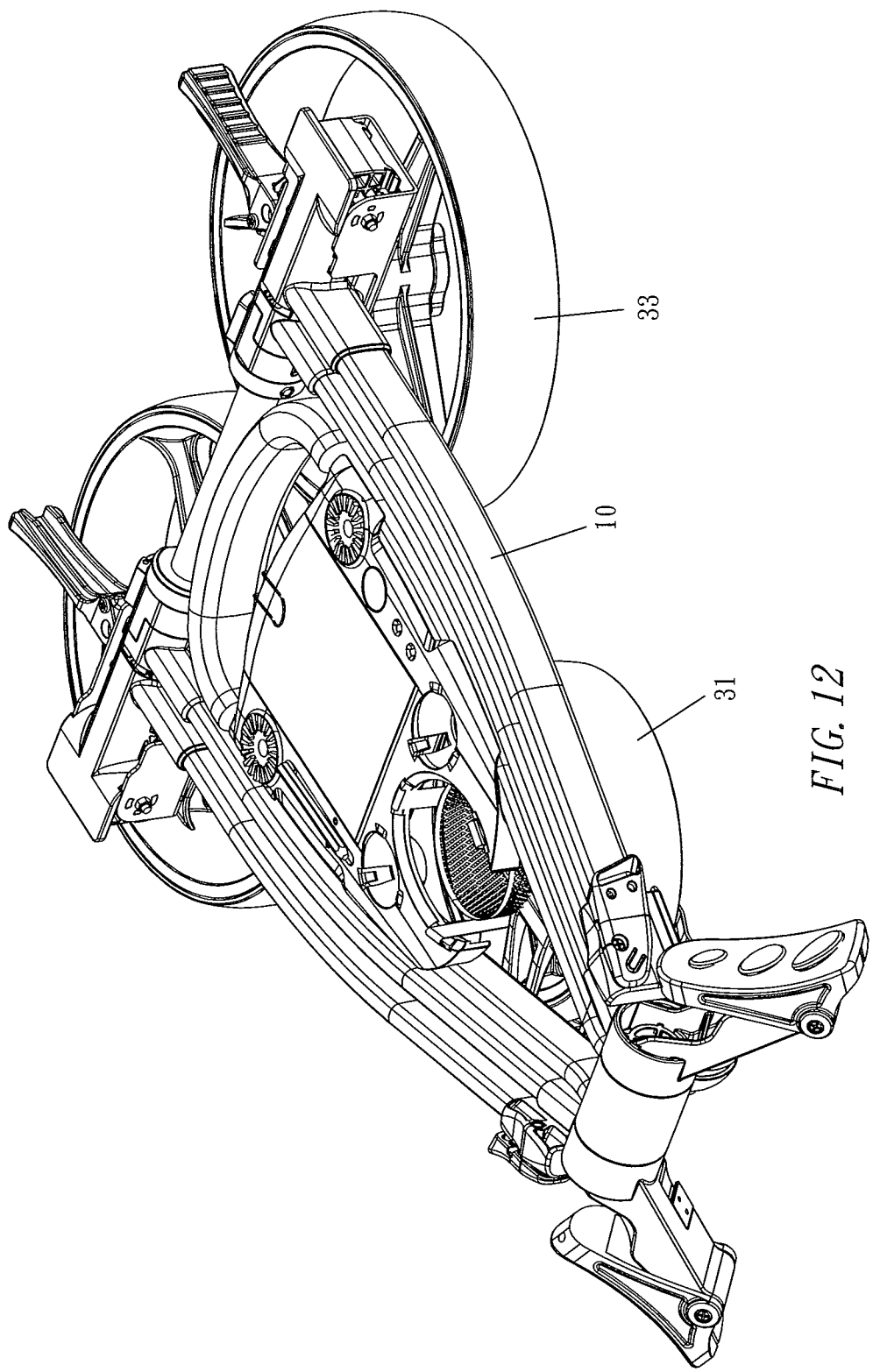
FIG. 12 is a perspective view of a folded cart of the present invention.

If it is necessary to fold the cart, users can press the press plate 15 to separate the direction pin 11 and the bump 151 from the latch hole 221 and the notch 261 respectively, such that the rotating fixed block 21 and the gear disk 26 are no longer latched with the moving base 2 anymore. In the meantime, the rotating fixed block 21 can be folded inwardly by using the rod 24 as the rotating shaft, and the transmission and engagement of the semicircular gear 14 with the gear disk 26 through the fixed base can drive the front wheel 31 to be folded counterclockwise and disposed at a horizontal state by the gear disk 26 that uses the fixed shaft 23 as the rotating shaft as shown in FIGS. 6 to 10. Now, the stop column 12 of the fixed base is latched into the elastic slot 222 of the rotating fixed block to fix the fixed base 1 and the moving base 2 into positions as shown in FIG. 11, to achieve the effect of folding and disposing the front wheel 31 at a horizontal state. Finally, the cart frame 10 and the rear wheel 33 are folded, so that the front and rear wheels 31, 33 are attached parallel to the cart frame 10 as shown in FIG. 12 to achieve the effects of reducing the packaging volume, saving the transportation cost and storage space, and facilitating the transportation of the goods.

Figure 3:
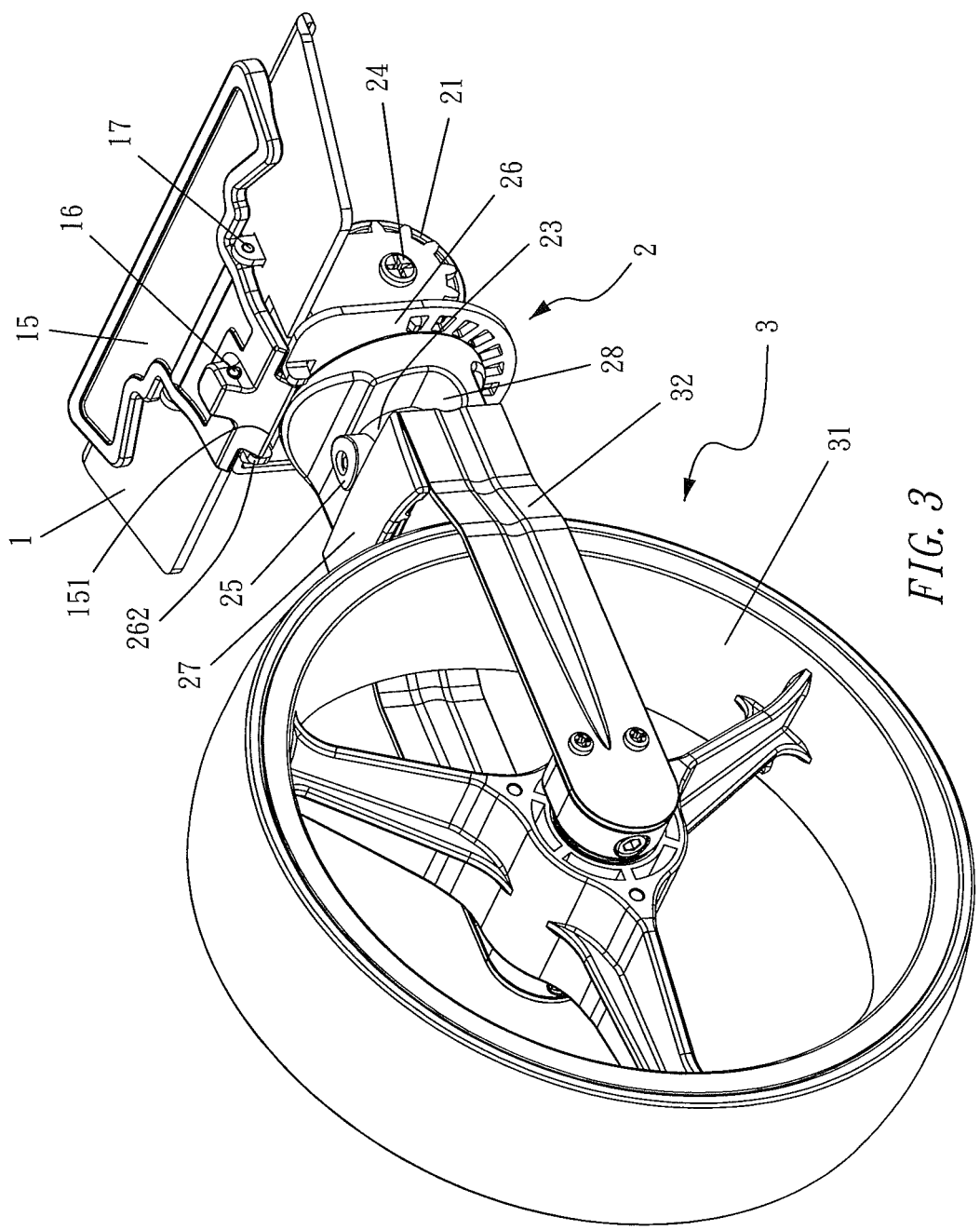
FIG. 3 is a perspective view of the present invention.
Figure 4:
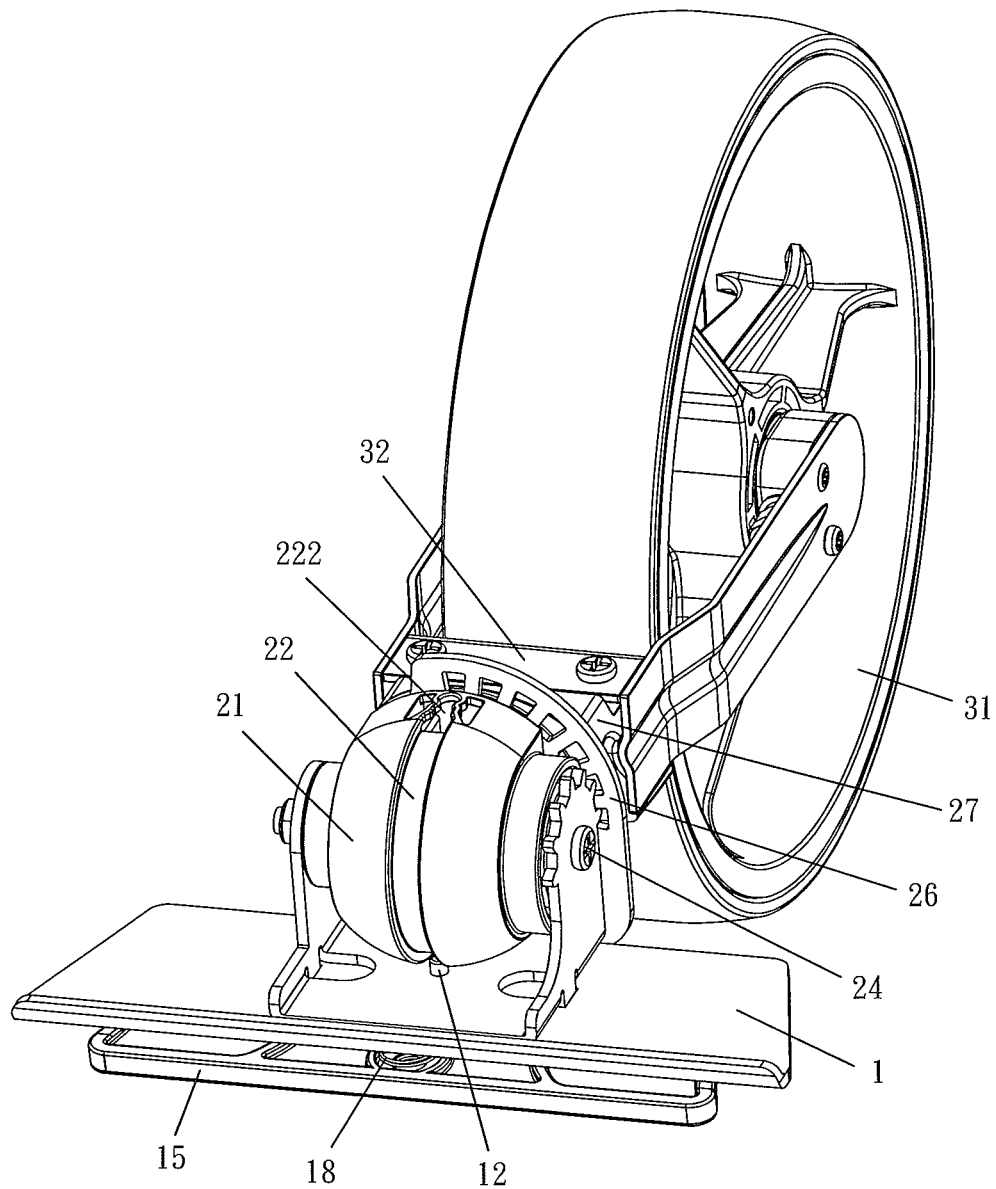
FIG. 4 is a perspective upside-down view of the present invention.
Figure 5:
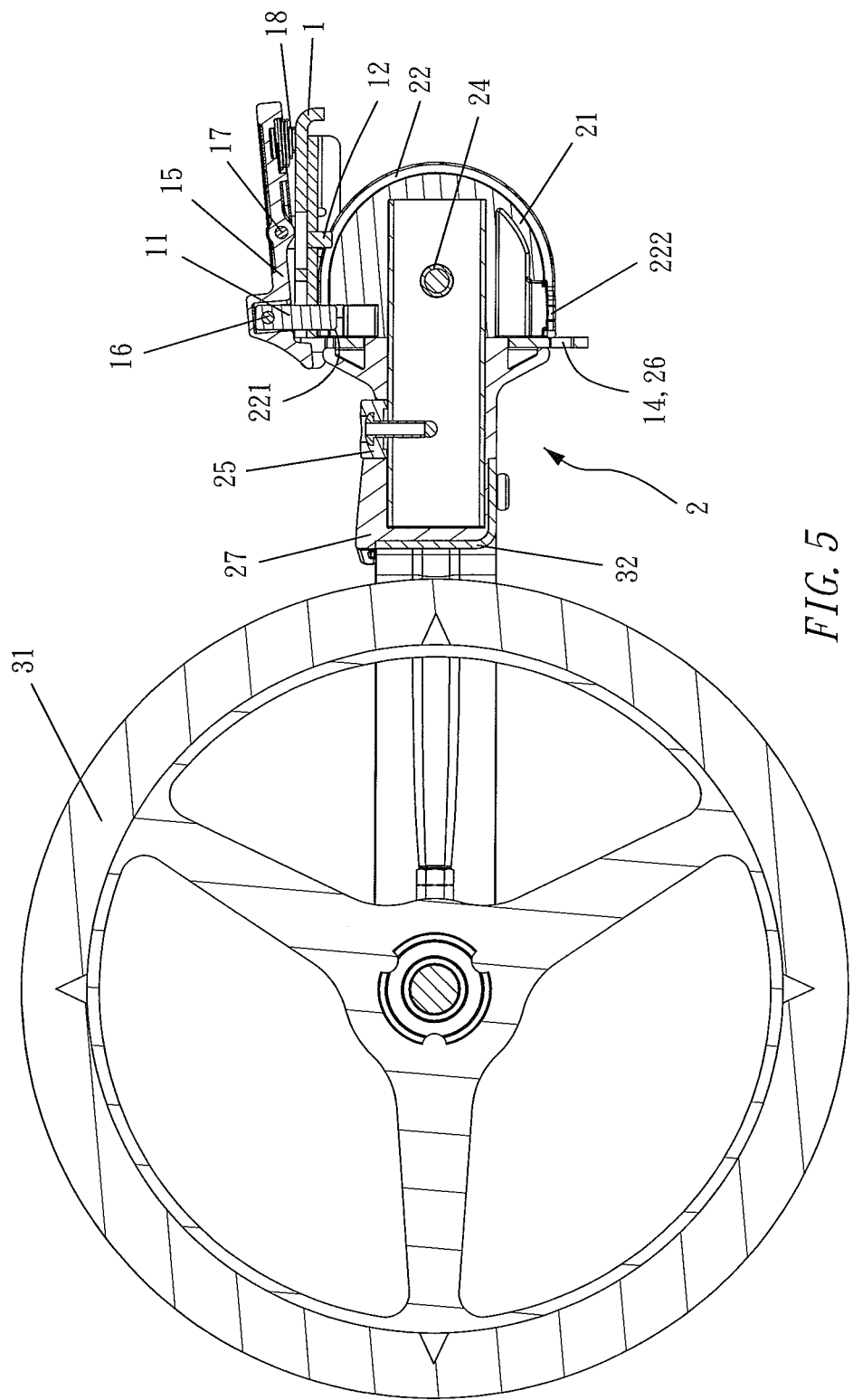
FIG. 5 is a cross-sectional view of the present invention.
Figure 6:
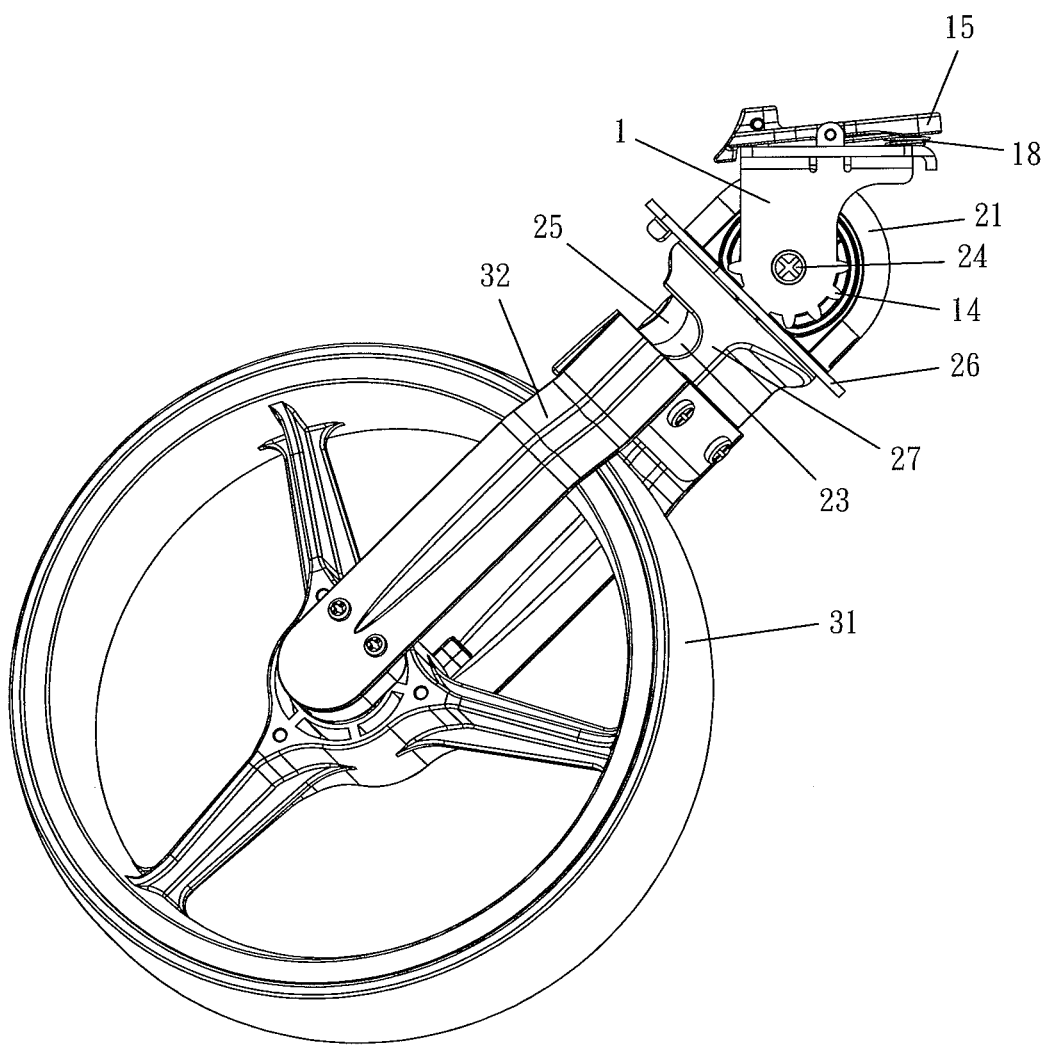
FIG. 6 is a side view of a front wheel of the present invention rotated at 45°.
Figure 7:
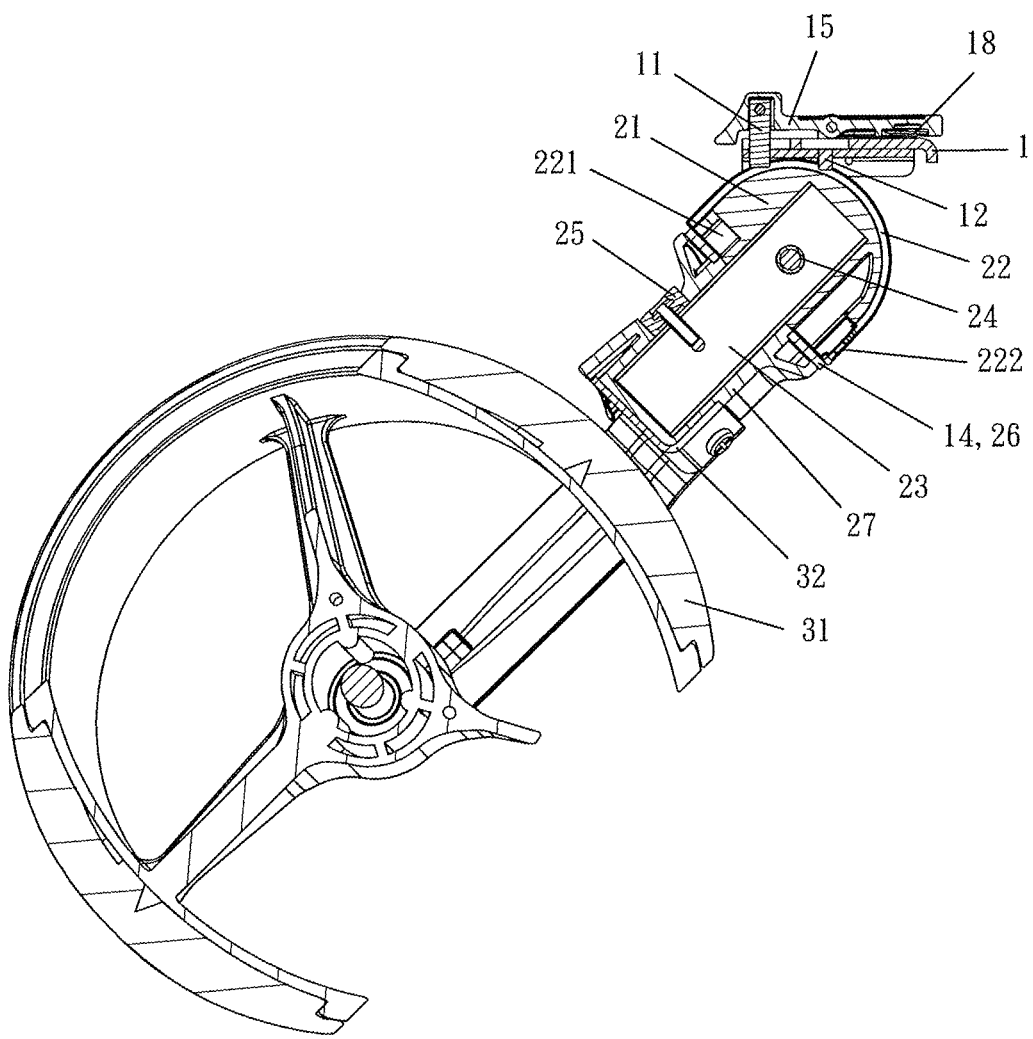
FIG. 7 is a cross-sectional view of a front wheel of the present invention rotated at 45°.
Figure 8:
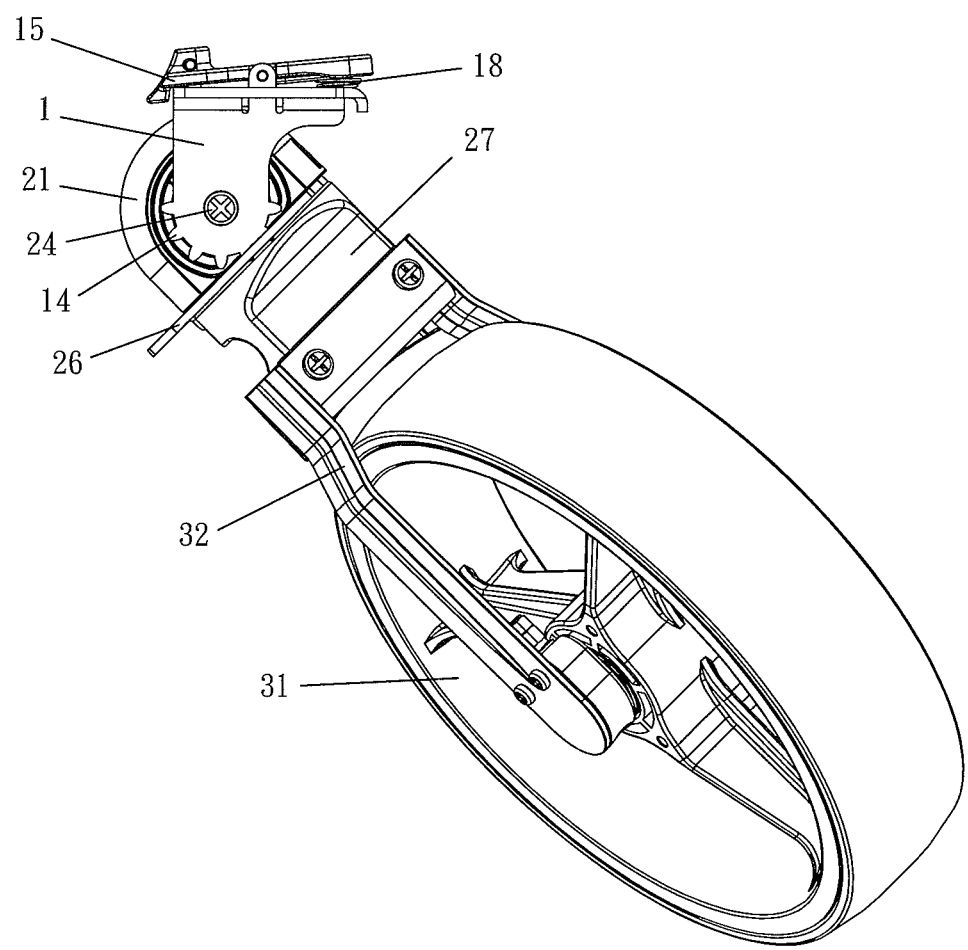
FIG. 8 is a side view of a front wheel of the present invention rotated at 135°.
Figure 9:
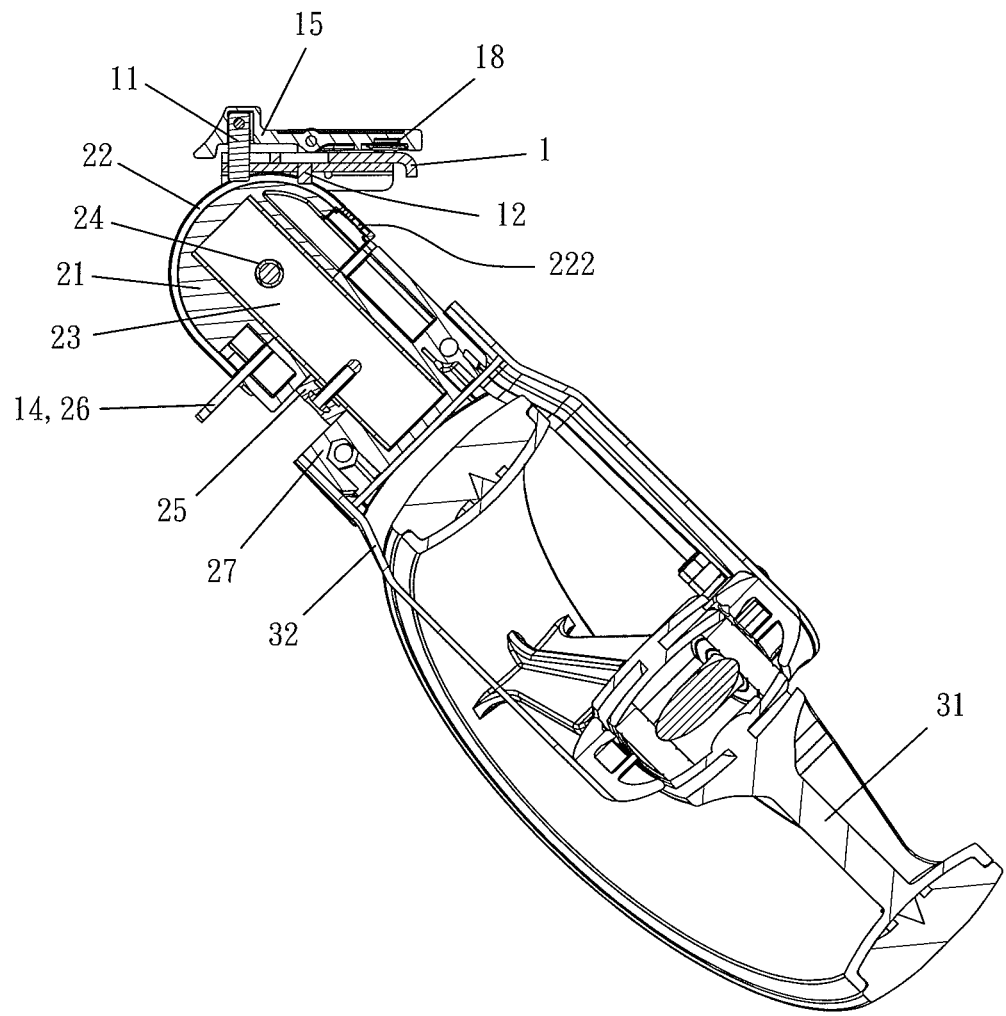
FIG. 9 is a cross-sectional view of a front wheel of the present invention rotated at 135°.
Figure 10:
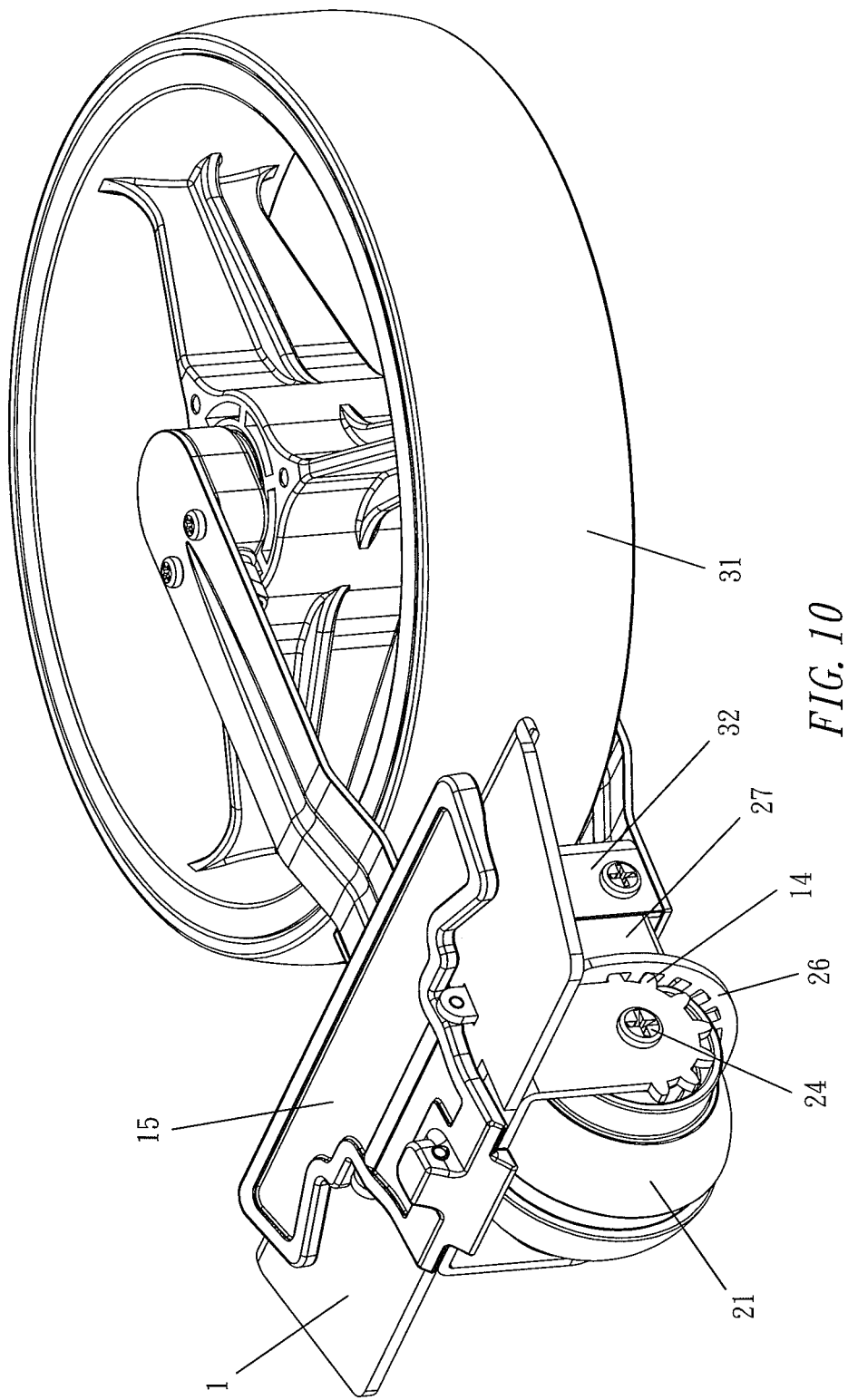
FIG. 10 is a perspective view of a front wheel of the present invention disposed at a horizontal state.

If it is necessary to unfold the cart, users can turn the front wheel 31 directly to separate the stop column 12 from the elastic slot 222, while using the rod 24 as a rotating shaft of the rotating fixed block 21. The semicircular gear 14 of the fixed base engaged with the gear disk 26 provides transmissions, such that the gear disk 26 can use the fixed shaft 23 as a rotating shaft to drive the front wheel 31 to be unfolded in a clockwise direction and in an erect state, to resume the original unfolded status as shown in FIGS. 3 to 5.

In summation, the present invention has the following advantages and effects.
1. The folding device of the present invention is comprised of the fixed base 1 and the moving base 2, thus, having a very simple structure.
2. The fixed base 1 has the press plate 15 to control fixing or detaching the direction pin 11 and the stop column 12 with respect to the moving base 2 (rotating fixed block 21).
3. The moving base 2 uses the fixed shaft 23 and the rod 24 as the rotating shafts, while using the gear disk 26 engaged with the semicircular gear 14 of the fixed base 1 as a guide, to achieve reciprocal rotating movements.
4. The fixed shaft stop block 25 is disposed in the connecting block groove 28, so that the connecting block 27 can be rotated by using the fixed shaft 23 as the rotating shaft only.
5. When the cart is folded, users simply press the press plate 15 to turn the moving base 2 and the front wheel set 3 upward, so that the front wheel 31 is attached parallel to the cart frame 10, to complete the operations of disposing the front wheel 31 at a horizontal state and folding the cart at a time, and provide a convenient and quick operation to users.
6. The present invention can be applied in any three-wheel hand cart such as the baby cart and the goods transport cart with the same effect, in addition to the golf bag cart.

In summation of the description above, the present invention improves over the prior art.

What is claimed is:

1. A front wheel folding device for a three-wheel cart including a golf bag cart, a baby cart or a goods transport cart, comprising:
   a fixed base having an upper end coupled to a cart frame, an elastic press plate, and a plurality of teeth;
   a moving base coupled to the fixed base by a rod, with the moving base having a gear disk engaged with the plurality of teeth of the fixed base for performing a reciprocal rotating movement, wherein the moving base comprises:
   a rotating fixed block coupled to the fixed base by a rod and having a channel;
   a fixed shaft having an end fixed to the rotating fixed block and a stop block;
   a connecting block disposed at another end of the fixed shaft and having a groove for containing the stop block; and
   a gear disk mounted onto the fixed shaft, fixed to the connecting block, and engaged with the plurality of teeth of the fixed base; and
   a front wheel set mounted to the moving base and having a front wheel.

2. The front wheel folding device of claim 1, wherein the elastic press plate has a bump disposed at a front end of the elastic press plate.

3. The front wheel folding device of claim 1, wherein the fixed base comprises a direction pin penetrating through both top and bottom sides of the fixed base, a stop column protruded downwardly, and two lugs disposed at a lower end of the fixed base and having a semicircular gear disposed at a bottom of the two lugs.

4. The front wheel folding device of claim 1, wherein the rotating fixed block includes a latch hole formed at a front end of the channel and an elastic slot formed at a rear end of the channel.

5. The front wheel folding device of claim 1, wherein the gear disk includes a notch formed at an upper end of the gear disk and a stop plate disposed on both sides of the notch separately.

\* \* \* \* \*